(12) United States Patent
Nakai

(10) Patent No.: US 8,880,750 B2
(45) Date of Patent: Nov. 4, 2014

(54) PERIPHERAL DEVICE, INFORMATION PROCESSING SYSTEM, CONTROL METHOD, AND STORAGE MEDIUM

(71) Applicant: Canon Kabushiki Kaisha, Tokyo (JP)

(72) Inventor: Hironobu Nakai, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/754,965

(22) Filed: Jan. 31, 2013

(65) Prior Publication Data

US 2013/0219083 A1     Aug. 22, 2013

(30) Foreign Application Priority Data

Feb. 16, 2012 (JP) .................. 2012-031622

(51) Int. Cl.
*G06F 3/00* (2006.01)
*G06F 15/177* (2006.01)
*G06F 13/10* (2006.01)

(52) U.S. Cl.
CPC ..................................... *G06F 13/10* (2013.01)
USPC ................ 710/9; 710/15; 710/16; 709/220; 709/222

(58) Field of Classification Search
None
See application file for complete search history.

(56) References Cited

U.S. PATENT DOCUMENTS

| | | | |
|---|---|---|---|
| 6,947,964 B2 * | 9/2005 | Nishio | 709/202 |
| 7,664,886 B2 * | 2/2010 | Motoyama et al. | 710/8 |
| 7,873,691 B2 * | 1/2011 | Nishio | 709/202 |
| 8,176,213 B2 * | 5/2012 | Ogata et al. | 710/11 |
| 8,364,805 B2 * | 1/2013 | Mandell | 709/223 |
| 2001/0044822 A1 * | 11/2001 | Nishio | 709/202 |
| 2005/0251569 A1 * | 11/2005 | Nishio | 709/223 |
| 2008/0195767 A1 * | 8/2008 | Nagai et al. | 710/11 |

FOREIGN PATENT DOCUMENTS

JP     2008-65831 A     3/2008

* cited by examiner

*Primary Examiner* — Michael Sun
(74) *Attorney, Agent, or Firm* — Carter, DeLuca, Farrell & Schmidt, LLP (57) ABSTRACT

A multi-function peripheral (MFP) sets an enterprise number that responds to an external device regardless of a specific rule corresponding to a request when the MFP receives the request for acquiring management information base (MIB) information in which a specific object identifier (ID) is designated from an external device. The MFP receives the request for acquiring MIB information from a PC and responds the set enterprise number to the request.

10 Claims, 8 Drawing Sheets

PERIPHERAL DEVICE, INFORMATION PROCESSING SYSTEM, CONTROL METHOD, AND STORAGE MEDIUM

BACKGROUND OF THE INVENTION

1. Field of the Invention

The present invention relates to a peripheral device, an information processing system, a control method, and a storage medium.

2. Description of the Related Art

A method for managing devices connected to a network using SNMP (Simple Network Management Protocol) and MIB has been proposed. SNMP is an abbreviation for Simple Network Management Protocol and is a protocol that manages or controls devices connected to a network. Examples of such devices connected to a network include a network printer, a network multi-function peripheral, a HUB, and a router. In the information industry, SNMP is the de facto standard for acquiring and changing management information in devices such as network devices described above.

MIB is an abbreviation for Management Information Base. MIB is a set of management information about network devices to be managed by SNMP. More specifically, MIB is stored in simple database having a hierarchical structure. Also, MIB is defined in ASN.1 (Abstract Syntax Notation One).

A device (SNMP agent) correctly interprets an SNMP request transmitted from a management terminal (SNMP manager), and transmits the relevant MIB information back to the management terminal (SNMP manager) to thereby perform device management.

For MIB information, the following MIB standards defined in RFC (Request for Comments) are present:

RFC3805-Printer MIB v2

Define an object for managing a printer

RFC2790-Host Resources MIB

Define an object which is common to a computer system

RFC1213-Management Information Base for Network Management

Basic MIB to be utilized by all the SNMP agents

Define system information, interface information, TCP information, and the like

On the other hand, a vendor can also independently perform the expansion of MIB information for each vendor using enterprise object identifier. Upon expansion of MIB information, a vendor firstly submits an enterprise number (Private Enterprise Number) to IANA (Internet Assigned Number Authority). Then, the subtree of the enterprise number is defined under enterprises as Private MIB. In this manner, MIB information is expanded.

The significant part of the content defined in enterprise expansion using Private MIB is basically vendor unique information not defined by RFC, and thus, the SNMP manager can acquire management information by interpreting Private MIB.

A part of devices has the subtree of enterprise numbers for a plurality of vendors. There has been proposed a system in which an SNMP manager acquires information from devices having a plurality of enterprise numbers using different protocol and then changes mapping to make the devices distinguishable from each other to thereby perform uniform management (e.g., Japanese Patent Laid-Open No. 2008-65831).

In recent years, the utilization of a service, which is called an MPS (Managed Print Service), has been expanding in order to efficiently manage devices connected to a network. Examples of MPS application include WebJetAdmin, PrintFleet, Uniflow, FMAudit, and PrintAudit which are made by HP. In addition to these MPS applications, various types of manufacturers propose various types of MPS applications. For example, there is an MPS application (MPS application B) that specifies a device manufacturer using an enterprise object identifier to thereby change an inquiry method for inquiring an MIB information acquisition packet other than standard RFC definition.

An external device including the MPS application B issues, for example, an SNMP GetNext request or an SNMP GetBulk request to the MIB-OID of enterprises (1.3.6.1.4.1). The OID (object ID) is an abbreviation for Object IDentifier. The GetNext request is a request for acquiring information about a node next to a node corresponding to the object ID (MIB-OID) designated by the request. The device that has received the GetNext request responds with an enterprise number that is subordinate to enterprises (1.3.6.1.4.1) which is the node corresponding to the MIB-OID. When a plurality of enterprise numbers is present, the device firstly responds with the enterprise number having a smaller value. The external device manages the device based on the firstly responded enterprise number.

The GetBulk request is a request for collectively acquiring information about a node next to a node corresponding to the MIB-OID designated by the request. For example, a description will be given by taking an example in which the external device designates the MIB-OID of enterprises (1.3.6.1.4.1) in the GetBulk request. The device that has received the GetNext request collectively responds with the enterprise numbers that are subordinate to the enterprises (1.3.6.1.4.1) which is the node corresponding to the MIB-OID. The external device manages the device based on the enterprise number having a smaller value from among the collectively responded enterprise numbers.

In other words, each of the GetNext request and the GetBulk request is a request for acquiring an enterprise number(s) of a lower node in accordance with the specific rule. The MPS application switches the OID of Private MIB to be acquired by MPS based on the enterprise object identifier (enterprise number) firstly transmitted back from a device to be managed.

On the other hand, there is a trend of increasing devices each having a plurality of enterprise object identifiers due to mergers and acquisitions of enterprises. For devices actively using OEM (Original Equipment Manufacturer), there is also a trend of increasing devices each having a plurality of enterprise object identifiers. For such devices each having a plurality of enterprise object identifiers, predetermined vendor specifying processing cannot be properly made in the MPS application, resulting in trouble in desired device management.

Here, it is assumed that a printer having a plurality of enterprises such as OCE company, CANON, or the like is to be managed. The enterprise object identifier of OCE company is 1552, and the enterprise object identifier of CANON is 1602. The MPS application B makes, for example, a SNMP GetNext request to the enterprises of a device to be managed, and then changes the acquisition content of subsequent Private MIB information in accordance with the enterprise number of the reply value.

The enterprise number firstly transmitted back from a printer as a response to the GetNext request from the MPS application B is the enterprise number of OCE company. Hence, the MPS application B determines that the printer is the device of OCE company based on the firstly replied enterprise number. Thus, the MPS application B only acquires private information under the tree of OCE company in MIB, and does not acquire information as a printer of CANON.

However, for example, if there is no counter information in private information of OCE company, the use of counter information may cause a trouble in counting management. It should be freely determined by a user whether a user wishes to monitor the introduced MPS as a printer of OCE company or as a printer of CANON. However, the aforementioned MPS application manages the subsequent peripheral device based on the enterprise number firstly transmitted back from the network device to be managed, i.e., the peripheral device. In the above example, the introduced MPS is always managed as a printer of OCE company. Thus, it is necessary that information required for a device can be acquired even in the MPS environment which is already being used by a user. For that purpose, it is necessary that an enterprise number which is preferentially responded upon receiving the GetNext/GetBulk request can be set by a device side.

SUMMARY OF THE INVENTION

The peripheral device of the present invention is a peripheral device that has a plurality of values as enterprise numbers for MIB and sets an enterprise number which responds to a request for acquiring an enterprise number of a lower node in accordance with the specific rule.

According to an aspect of the present invention, a peripheral device having a plurality of values as enterprise numbers for MIB is provided. The peripheral device includes a setting unit configured to set an enterprise number that responds to an external device regardless of a specific rule corresponding to a request when the setting unit receives the request for acquiring an enterprise number of a lower node from the external device in accordance with the specific rule in which a specific object ID is designated; and a responding unit configured to receive the request and respond the enterprise number set by the setting unit to the request.

Further features of the present invention will become apparent from the following description of exemplary embodiments with reference to the attached drawings.

DESCRIPTION OF THE EMBODIMENTS

Figure 1:
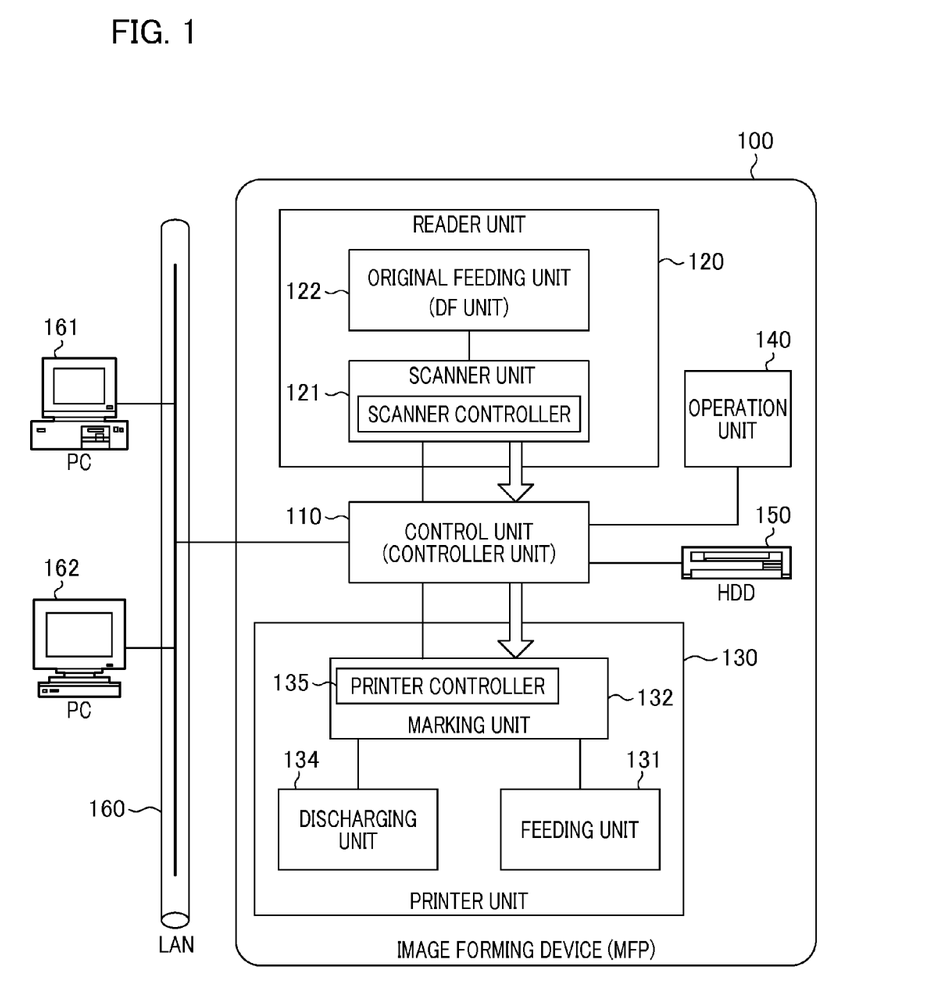
FIG. 1 is a diagram illustrating an example of the configuration of an information processing system of the present embodiment.

FIG. 1 is a diagram illustrating an example of the configuration of the information processing system of the present embodiment. The information processing system shown in FIG. 1 includes PCs 161 and 162 and an image forming device 100. The image forming device 100 is the peripheral device of the present embodiment. The image forming device 100 is an MFP having a plurality of functions such as a copy function, a printer function, or the like. Note that the image forming device may also be an SFP (Single Function Peripheral) having a copy function only or a printer function only. Hereinafter, the image forming device 100 is also described as an MFP 100.

The MFP 100 includes a controller unit (control unit) 110, a reader unit 120, a printer unit 130, and an operation unit 140. The controller unit 110 is in electrical connection with the reader unit 120 and the printer unit 130. The control unit 110 receives data from the reader unit 120 and the printer unit 130. Also, the control unit 110 transmits various commands to the reader unit 120 and the printer unit 130. Furthermore, the control unit 110 is connected to the PCs 161 and 162 via the network 160, and receives image data and a control command therefrom. The network 160 is constructed by, for example, Ethernet (registered trademark). The PCs 161 and 162 also monitor device configuration information or current status information with respect to the MFP 100.

The reader unit 120 optically reads an original image, and converts the image into image data. The reader unit 120 includes a scanner unit 121 that has a function of reading an original, and an original feeding unit 122 that conveys the original to a position readable by the scanner unit 121. A scanner controller 123 provided in the scanner unit 121 controls the scanner unit 121 and the original feeding unit 122 based on an instruction given by the control unit 110.

The printer unit 130 includes a feeding unit 131 that accommodates paper sheets (recording materials) for image formation (printout), a marking unit 132 that transfers image data onto a paper sheet and fixes it, and a discharging unit 134 that discharges a printed paper sheet.

The printer unit 130 feeds a paper sheet from the feeding unit 131 to the marking unit 132 based on an instruction given by the control unit 110, and prints image data onto the paper sheet using the marking unit 132. Then, the printer unit 130 discharges the paper sheet to the discharging unit 134. The discharging unit 134 may perform processing such as sorting, stapling, or the like to the paper sheet printed by the marking unit 132.

The feeding unit 131 includes a plurality of feeding units, and paper sheets are accommodated and placed (set) in each feeding unit. Each feeding unit may accommodate various types of paper sheets such as plain paper sheets, glossy paper sheets, or the like. Each feeding unit may also accommodate the paper sheet printed by the printer unit 130 of the MFP 100 again. Examples of such feeding unit include a feeding cassette, a feeding deck, a manual paper sheet tray, or the like. The feeding unit is not limited thereto but any other feeding unit may be employed as long as it can convey a paper sheet accommodated therein to the marking unit 132.

The operation unit 140 includes, for example, a hard key, a liquid crystal display unit, and a touch panel unit affixed to the surface thereof, and accepts an instruction from a user via these units. Also, the operation unit 140 can display a soft key and the function and state of the MFP 100 on the liquid crystal display unit. The operation unit 140 transmits a command corresponding to an instruction given by a user to the control unit 110. An HDD (Hard Disk Drive) 150 stores various settings of the MFP 100 and image data.

Based on the configuration described above, the MFP 100 realizes various functions such as a copy function, an image data transmission function, a printer function, or the like. When the MFP 100 realizes the copy function, the control unit 110 controls to cause the reader unit 120 to read image data of an original and to cause the printer unit 130 to print the image data onto a paper sheet. When the MFP 100 realizes the image data transmission function, the control unit 110 converts the original image data read by the reader unit 120 into code data, and transmits the code data to the PCs 161 and 162 via the network 160.

When the MFP 100 realizes the printer function, the control unit 110 converts code data (print data) received from the PCs 161 and 162 via the network 160 into image data, and transmits the image data to the printer unit 130. The printer unit 130 prints a paper sheet using the received image data. The configuration of the control unit 110 will be described below with reference to FIG. 5. The control method of the present embodiment is realized by the processing units provided in the MFP 100 shown in FIG. 1. The computer program of the present embodiment causes a computer to execute the control method.

<Description of Standard Technology>

Next, a description will be given of information acquisition from a network device based on RFC issued by IETF for the purpose of standardization of technology used in Internet, where IETF is an abbreviation for Internet Engineering Task Force and RFC is an abbreviation for Request for Comments.

In general, SNMP (Simple Network Management Protocol) is widely used as information management protocol for a device on a network. A network device to be managed by SNMP includes MIB information and is managed by submitting a response to an SNMP request made from a management terminal. The structure of MIB information is also standardized by IEFT.

Figure 2:
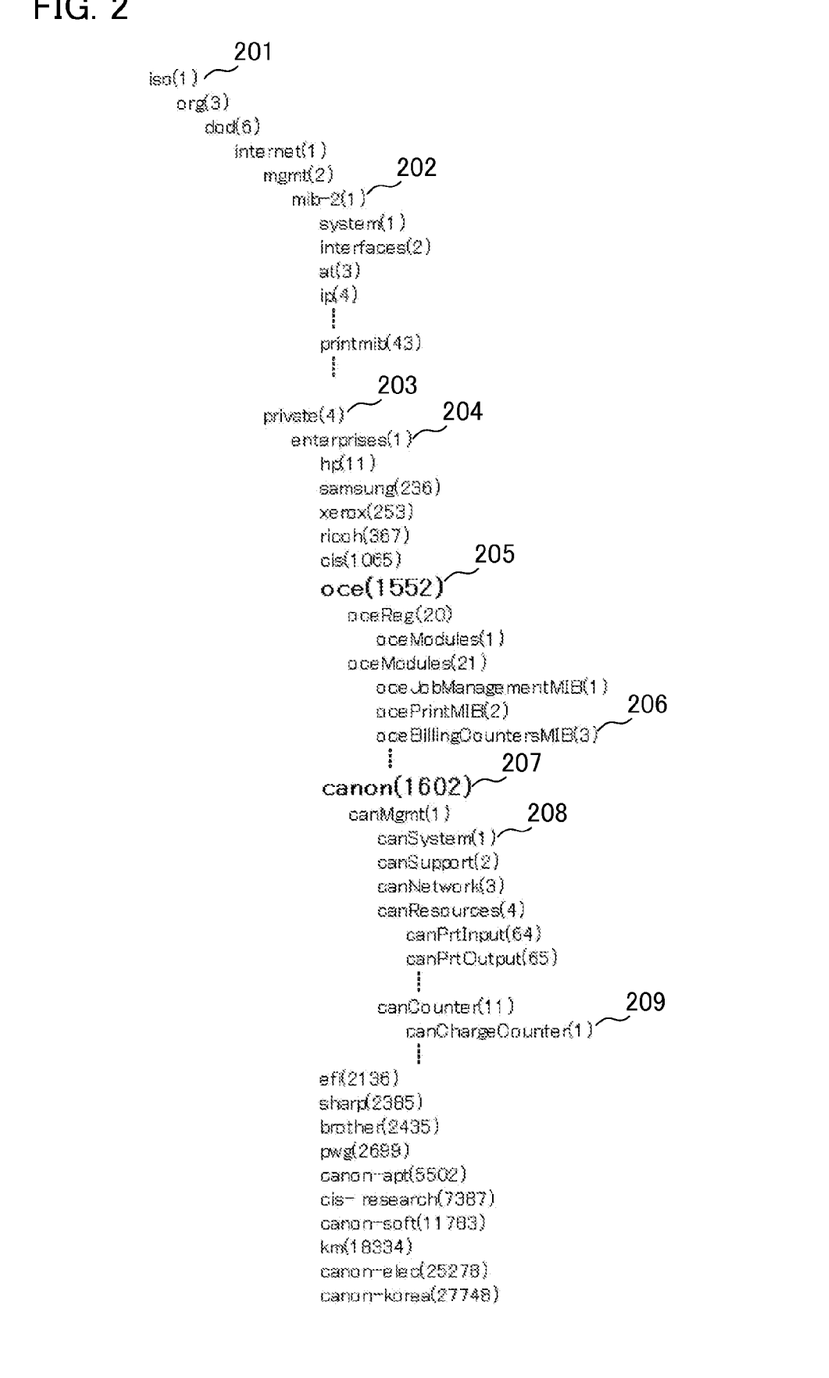
FIG. 2 is a diagram illustrating an exemplary structure of MIB information.

FIG. 2 is a diagram illustrating an exemplary structure of MIB information provided in MFP shown in FIG. 1. As shown in FIG. 2, MIB information is defined as a tree structure classified by the fields of businesses. As the most standard positioning, MIB information (standard MIB) is defined under mib-2(202). Mib-2(202) is defined under the tree of iso (201) defined by ISO. As the groups under mib-2, a subtree relating to system information defined by RFC, a printmib subtree relating to printer information, and the like are present.

Standard MIB is collected as a collection of general-purpose information which is not affected by the differences in network device manufacturers, the specification of devices, and the like. On the other hand, in contrast to standard MIB, MIB information that is uniquely expanded by each different vendor or the like is referred to as private MIB or expanded MIB that is collected to enterprises (204) under private (203) as a group dedicated for each different vendor.

In order to use an information group dedicated for each different vendor, identification information thereof is needed. More specifically, each vendor needs to submit her enterprise number to IANA to thereby acquire PRIVATE ENTERPRISE NUMBERS, where IANA is an abbreviation for Internet Assigned Numbers Authority.

Note that the list of enterprise numbers subjected to allocation is disclosed in the following URL:

http://www.iana.org/assignments/enterprise-numbers

In the example shown in FIG. 2, an enterprise number 1552 denoted by reference number 205 corresponds to OCE company, and an enterprise number 1602 denoted by reference number 207 corresponds to CANON. In other words, the MFP 100 has a plurality of values as the enterprise numbers for MIB.

Each company defines her unique MIB information under her enterprise number, and clarifies its specification by means of data structure or data format using SMI defined by RFC 1155 or the like, naming of management information, and a specification description language such as ASN.1, where SMI is an abbreviation for Structure of Management Information and ASN.1 is an abbreviation for Abstract Syntax Notation.1. In the example shown in FIG. 2, information relating to counter is defined by oceBillingCounterMIB denoted by reference number 206 and canChargeCounter denoted by reference number 209. In other words, information relating to counter is defined for each company.

Figure 3:
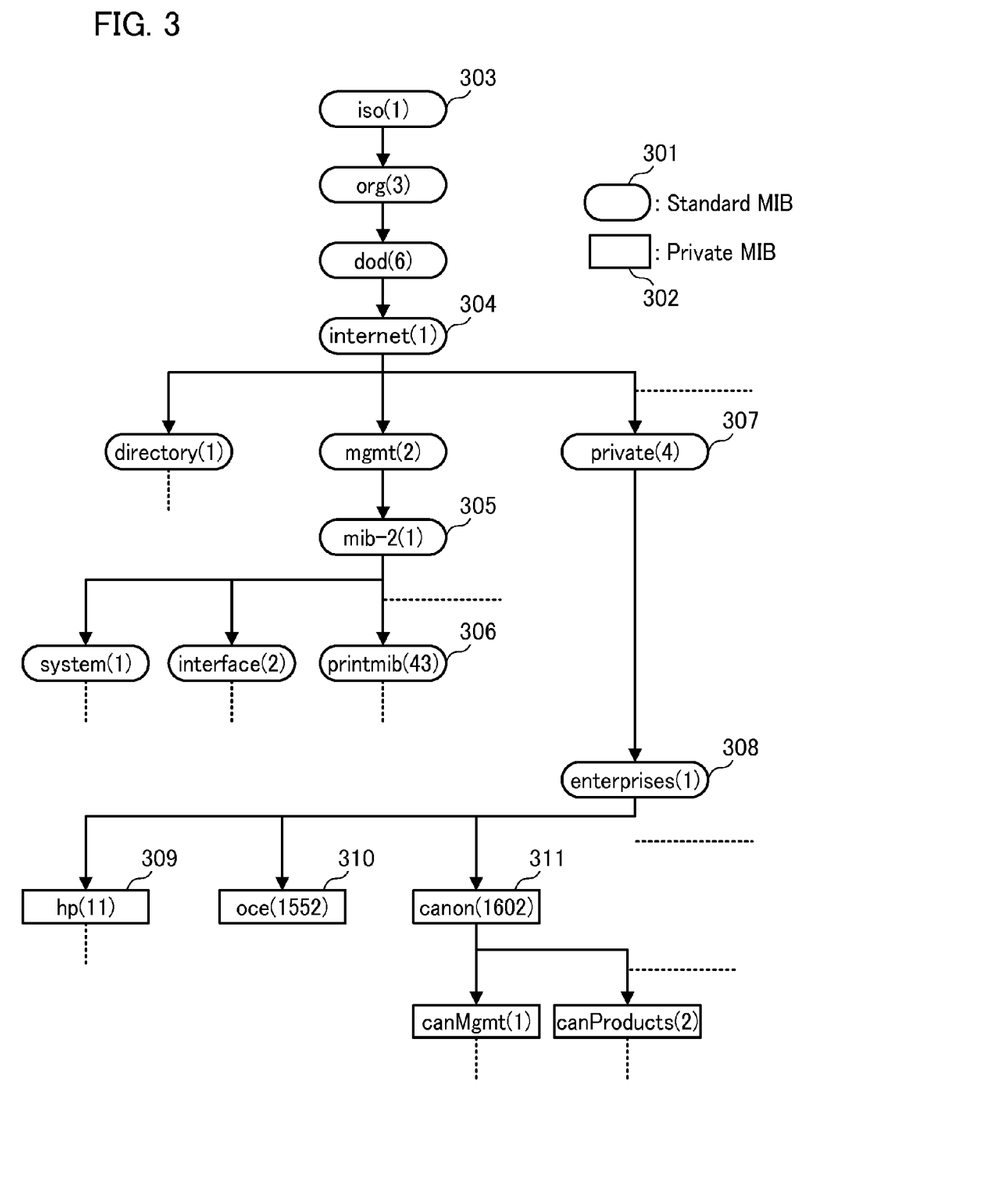
FIG. 3 is a diagram illustrating the hierarchical structure of MIB information.

FIG. 3 is a diagram illustrating the hierarchical structure of MIB information shown in FIG. 2. In FIG. 3, an administrative group of MIB information indicated by an ellipse with reference number 301 is standard MIB and an administrative group of MIB information indicated by a square with reference number 302 is Private MIB.

Reference number 303 is the highest identification number indicating the OID of MIB. Mib-2 denoted by reference number 305, private denoted by reference number 307, and enterprises denoted by reference number 308 are arranged under internet denoted by reference number 304. Mib-2 stores an information group of standard MIB. Also, private and enterprises are connected to Private MIB.

As an information group dedicated for each different vendor, hp (11) denoted by reference number 309, oce (1552) denoted by reference number 310, and canon(1602) denoted by reference number 311 are arranged under enterprises denoted by reference number 308 using their enterprise numbers as their identifiers.

In the present embodiment, it is assumed that the MPS application B is operated on an external device serving as the acquisition request source of MIB information. Thus, the term MIB application used in the following description means MIB application B. MIB application makes an MIB information acquisition request to the MFP 100. The MIB information acquisition request is a request, such as a GetNext request, a GetBulk request, or the like, for acquiring an enterprise number of a lower node in accordance with the specific rule. An MIB information acquisition request is designated by a specific object ID (OID). The MFP 100 that has received the MIB information acquisition request acquires an enterprise number that is subordinate to a node corresponding to the OID designated by the MIB information acquisition request from MIB information stored in the MFP 100, and responds with the acquired enterprise number.

Figure 4:
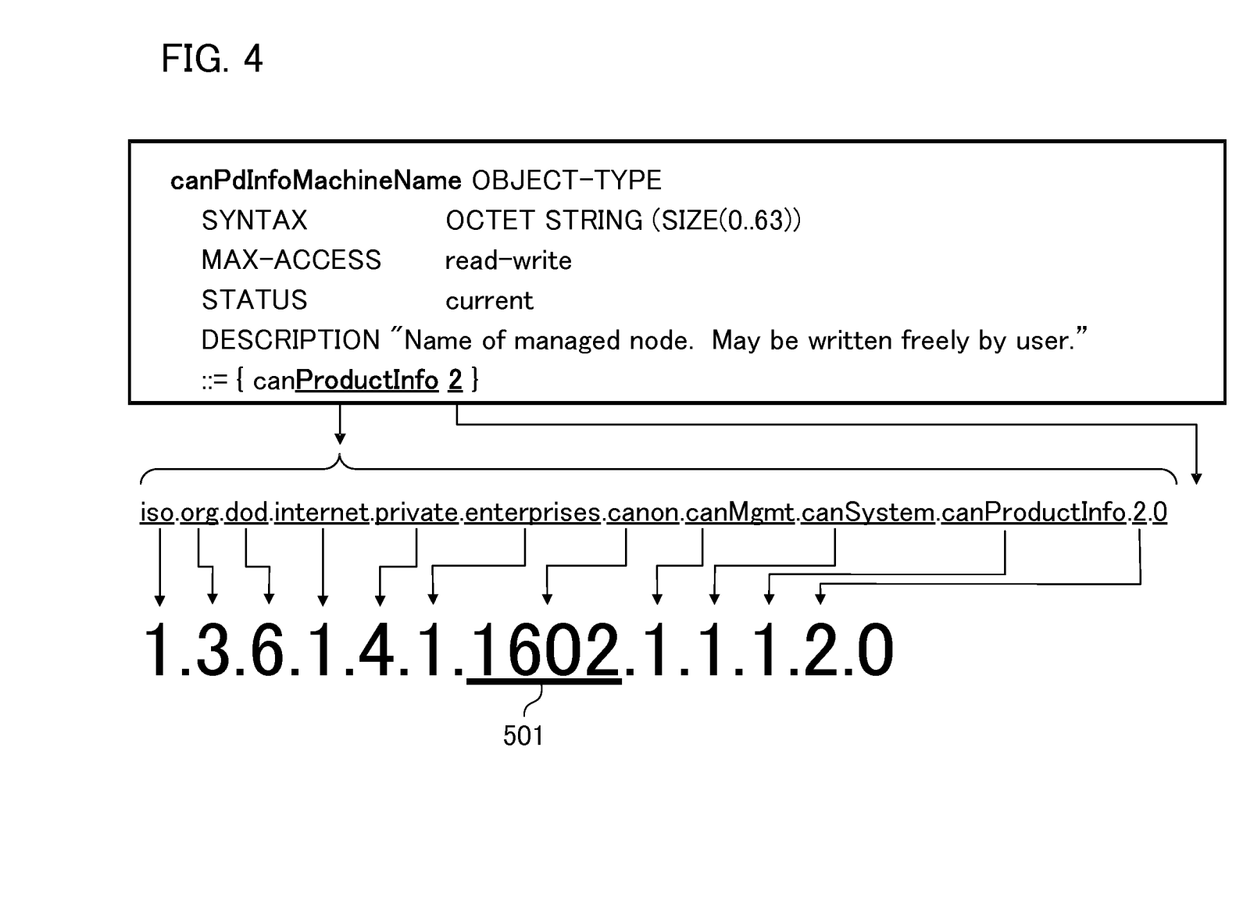
FIG. 4 is a diagram illustrating an example of ASN.1 description for an MIB object, where definition is made under an enterprise number.

FIG. 4 is a diagram illustrating an example of ASN.1 description for an MIB object, where definition is made under an enterprise number. It can be verified that an identifier 1602 denoted by reference number 501 is information dedicated for each different vendor that is present under the Private MIB of canon. When the OID is designated as a device name "canPdInfoMachineName" in the MIB information acquisition request, the OID corresponds to an object having a single value. Thus, the OID with ".0" attached to the end thereof indicates an instance.

Figure 5:
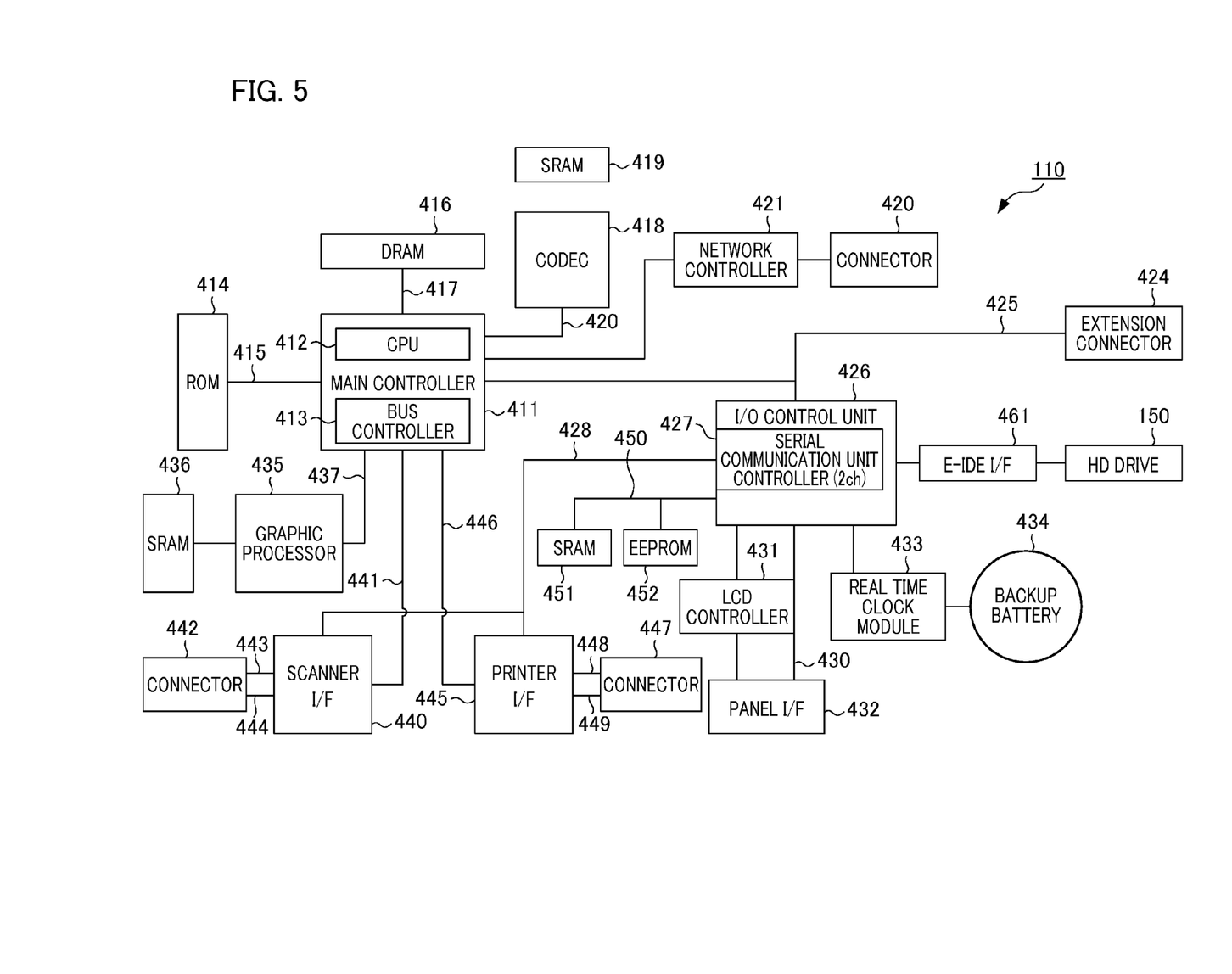
FIG. 5 is a diagram illustrating an example of the configuration of a control unit.

FIG. 5 is a diagram illustrating an example of the configuration of the control unit shown in FIG. 1. A main controller 411 includes a CPU 412, a bus controller 413, and various I/F controller circuits. The CPU 412 and the bus controller 413 integrally control the operation of the entire control unit 110. The CPU 412 executes various types of operations based on a program read from a ROM 414 via a ROM I/F 415. For example, the CPU 412 interprets code data (e.g., PDL (page description language)) received from the PC 161 or the PC 162 shown in FIG. 1 based on the read program. A specific function of the present embodiment is that a program (MIB information acquisition program) for acquiring MIB information about MFP is stored in the ROM 414 in advance. The bus controller 413 performs control regarding data transfer via each I/F, such as bus arbitration and DMA data transfer.

A DRAM 416 is connected to the main controller 411 via a DRAM I/F 417, and is used as a work area used by the CPU 412 for operation or a region for accumulating image data. As a function specific to the present embodiment, the DRAM 416 stores MIB information about MFP. The MIB information has, for example, the structure described with reference to FIGS. 2 and 3.

A Codec 418 performs processing for compressing raster image data accumulated in the DRAM 416 by means of MH/MR/MMR/JBIG/JPEG method or expanding code data accumulated in the compressed state into raster image data. A SRAM 419 is used as a temporal work area for the Codec 418. The Codec 418 is connected to the main controller 411 via an I/F 420. Data transfer between the SRAM 419 and the DRAM 416 is controlled by the bus controller 413 and is realized by DMA transfer.

A Graphic Processor 435 performs processing such as image rotation, image magnification, color space conversion, binarization, or the like with respect to raster image data accumulated in the DRAM 416. A SRAM 436 is used as a temporal work area for the Graphic Processor 435. The Graphic Processor 435 is connected to the main controller 411 via an I/F 437. Data transfer between the Graphic Processor 435 and the DRAM 416 is controlled by the bus controller 413 and is realized by DMA transfer.

A Network Controller 421 is connected to the main controller 411 via an I/F 423 and is connected to an external network (e.g., a network 160) via a connector 422. An extension connector 424 for connecting an extension board and an I/O control unit 426 are connected to a general-purpose high-speed bus 425. The general-purpose high-speed bus 425 is, for example, a PCI bus. The I/O control unit 426 includes two channels of a pacing synchronization serial communication unit controller 427 that performs transmission/reception of a control command between the CPUs provided in the reader unit 120 and the printer unit 130.

The I/O control unit 426 is connected to a scanner I/F 440 and a printer I/F 445 via an I/O bus 428. A panel I/F 432 is an I/F for use in transmitting/receiving data to/from the operation unit 140. The panel I/F 432 transfers image data transferred from an LCD controller 431 to the operation unit 140. Also, the panel I/F 432 transfers a key input signal input via a hard key or a touch panel provided in the operation unit 140 to the I/O control unit 426 via a key input I/F 430.

A real time clock module 433 is supplied with power by a backup battery 434, and updates/stores a date and time to be managed within the MFP 100. An E-IDE I/F 461 is an I/F for connecting the HDD 150. The CPU 412 causes the HDD 150 to store image data or reads image data from the HDD 150 via the E-IDE I/F 461.

The reader unit 120 and the printer unit 130 are connected to a connector 442 and a connector 447, respectively. The connector 442 and the connector 447 are connected to the scanner I/F 440 and the printer I/F 445 via pacing synchronization serial I/F (443, 448) and video I/F (444, 449), respectively.

The scanner I/F 440 is connected to the reader unit 120 via the connector 442 and is connected to the main controller 411 via a scanner bus 441. The scanner I/F 440 performs predetermined processing for an image received from the reader unit 120. Also, the scanner I/F 440 outputs a control signal generated on the basis of the video control signal received from the reader unit 120 to the scanner bus 441. Data transfer from the scanner bus 441 to the DRAM 416 is controlled by the bus controller 413.

The printer I/F 445 is connected to the printer unit 130 via the connector 447 and is connected to the main controller 411 via a printer bus 446. The printer I/F 445 performs predetermined processing for image data output from the main controller 411 and outputs the resulting image data to the printer unit 130. The transfer of raster image data expanded on the DRAM 416 to the printer unit 130 is controlled by the bus controller 413. The raster image data is DMA-transferred to the printer unit 130 via the printer bus 446, the printer I/F 445, and the video I/F 449.

An SRAM 451 is a memory that can continuously keep memory contents with the aid of power supplied from a backup battery even if the supply of power to the entire MFP 100 has been interrupted. The SRAM 451 is connected to the I/O control unit 426 via a bus 450. Likewise, an EEPROM 452 is also a memory that is connected to the I/O control unit 426 via the bus 450.

A description will be given of processing for storing MIB information in DRAM and processing for returning MIB information when the MFP 100 receives an MIB information acquisition request with reference to FIG. 5. Firstly, when the MFP 100 is activated, the CPU 412 reads an MIB information acquisition program from the ROM 414 and executes it. In this manner, the CPU 412 acquires MIB information via, for example, the scanner I/F 440 and the printer I/F. The CPU 412 stores the acquired MIB information in the DRAM 416.

On the other hand, the CPU 412 receives an MIB information acquisition request from an external device (e.g., the PC 161) via the connector 422 and the Network Controller 421. The CPU 412 acquires MIB information from the DRAM 416 in response to the received MIB information acquisition request. Then, the CPU 412 transmits the acquired MIB information back to the request source via the Network Controller 421 and the connector 422.

Figure 6:
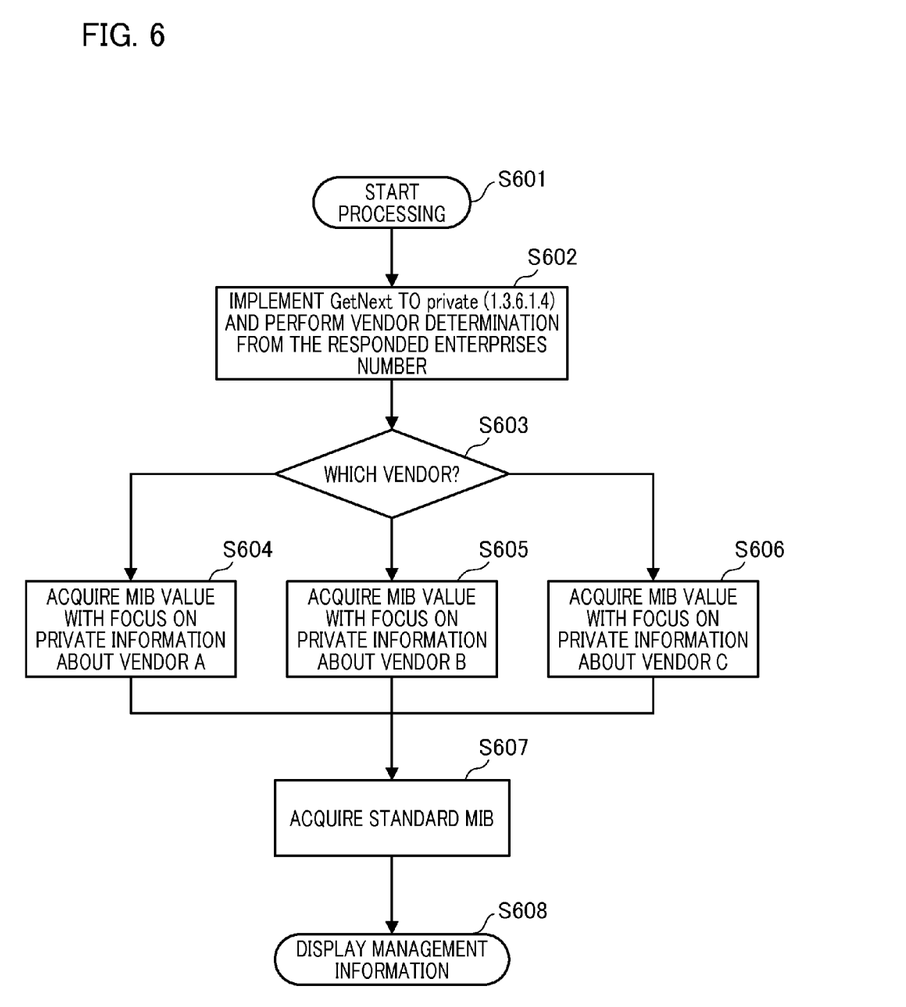
FIG. 6 is a flowchart illustrating an example of operation processing performed by an MPS application.

FIG. 6 is a flowchart illustrating an example of operation processing performed by MPS application. In this example, the CPU provided in the PC 161 executes MPS application. The PC 161 starts information acquisition processing from the MFP 100 using SNMP (step S601). The MPS application instructs the MFP 100 to GetNext private (1.3.6.1.4) using SNMP. In other words, the CPU provided in the PC 161 functions as a requesting unit for acquiring MIB information to the MFP 100. Also, the CPU functions as a receiving unit that receives an enterprise number corresponding to the MIB information acquisition request as a response from the MFP 100.

The MPS application determines which vendor s printer the MFP 100 is based on the returned enterprise number (steps S602 and S603). More specifically, the MPS application switches the acquisition logic of private MIB information based on the enterprise number. For example, when the MPS application determines that the MFP 100 is a printer of a vendor A based on the enterprise number, an inquiry about detailed MIB information is made to private MIB information about the vendor A (step S604).

When the MPS application determines that the MFP 100 is a printer of a vendor B based on the enterprise number, an inquiry about detailed MIB information is made to private MIB information about the vendor B (step S605). When the MPS application determines that the MFP 100 is a printer of a vendor C based on the enterprise number, an inquiry about detailed MIB information is made to private MIB information about the vendor C (step S606). In other words, the CPU for executing the MPS application functions as a managing unit that manages the MFP 100 which is a peripheral device of the reception source of a response to the MOB information acquisition request as a device of a type to be specified by the enterprise number included in the response. The CPU makes a request for acquiring management information that is subordinate to a node corresponding to the enterprise number for MIB to the MFP 100 that is managed as a device of a type to be specified by the responded enterprise number.

Next, the MPS application acquires not only vendor-specific MIB information but also MIB information about a printmib group or a system group exemplified in FIG. 2 as standard MIB (step S607). Examples of MIB information to be acquired as standard MIB information include printer status information, information about consumables such as toner or paper sheet, a serial number of an image forming device, counter information (the total number of printmib to be printed), or the like. Next, the PC 161 displays information acquired by the MPS application (step S608), and the process ends.

Figure 7:
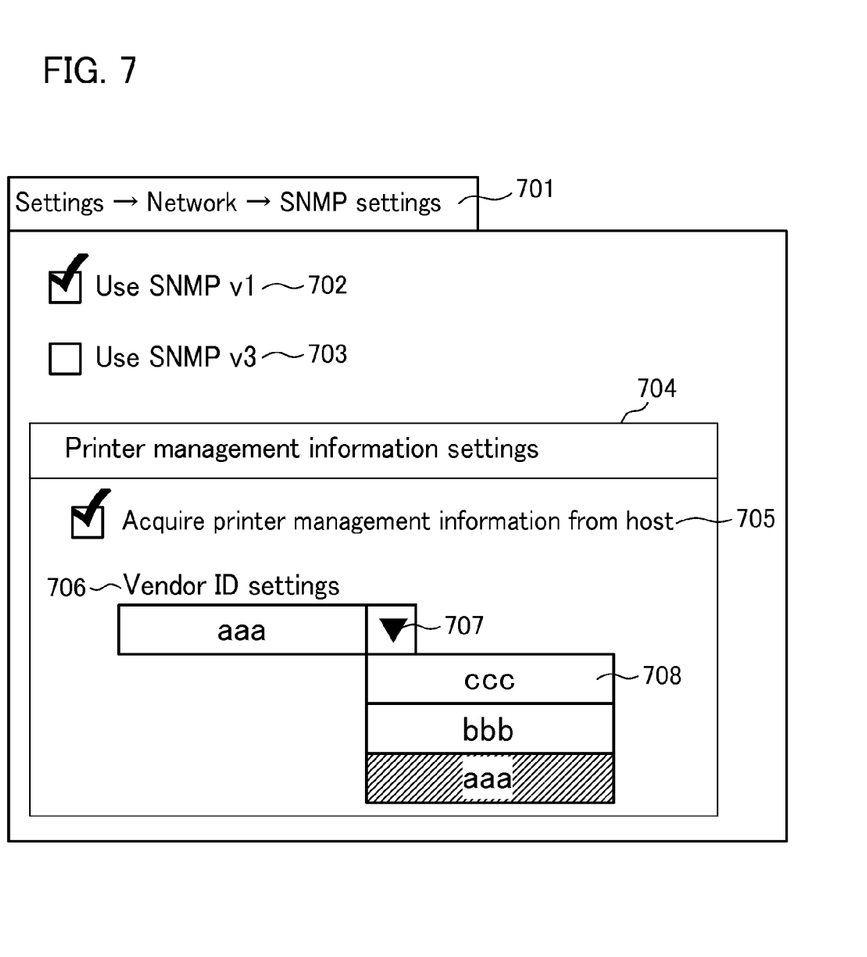
FIG. 7 is a diagram illustrating an example of SNMP setting processing executed by an MFP.

FIG. 7 is a diagram illustrating an example of SNMP setting processing to be executed by an MFP. The CPU 412 of the MFP 100 instructs the panel I/F 432 to display a setting screen 701 for SNMP on a screen. Reference number 702 denotes a setting column for setting whether or not SNMP v1 is used. Reference number 703 denotes a setting column for setting whether or not SNMP v3 is used. Reference number 704 denotes a setting column for setting information relating to the response of MIB information (printer management information) to the MIB information acquisition request.

In this example, a setting column 704 is a setting column to be displayed when the check box of a setting column 702 is checked by the user operation and SNMP v1 is set as SNMP for use in the MIB information acquisition request. In this example, the setting column 704 sets an enterprise number that is preferentially returned to the MIB information acquisition request. When SNMP v1 is set as SNMP for use in the MIB information acquisition request using the setting column 703, the CPU 412 may display a setting column different from the setting column 704. In other words, the CPU 412 provides a different method for setting the enterprise number in response to the version of SNMP for use in the MIB information acquisition request.

Reference number 705 denotes a setting column for setting whether or not the acquisition of management information about the MFP 100 from an external device (e.g., the PC 161) of the request source of management information is permitted. Reference number 706 denotes a setting column for setting a vendor ID (enterprise number) of the MFP 100. When a user presses down a button 707, a plurality of enterprise numbers is listed as MIB information about the MFP 100 as shown in reference number 708. For example, among the listed enterprise numbers, "aaa" is the enterprise number of the vendor A, "bbb" is the enterprise number of the vendor B, and "ccc" is the enterprise number of the vendor C.

When a user selects an enterprise number, which the user wishes to respond to an external device, from among the listed enterprise numbers, the CPU 412 functions as a setting unit that executes the following processing. The CPU 412 sets the selected enterprise number as the enterprise number which is preferentially responded to the request source of management information. In other words, the CPU 412 set an enterprise number that responds to an external device regardless of a specific rule corresponding to the MIB information acquisition request in accordance with a response enterprise number designating operation by a user. The CPU 412 may also set a response enterprise number in accordance with a non-response enterprise number designating operation by a user.

Although not shown in FIG. 7, the CPU 412 may also set a response enterprise number for each SNMP community setting, each SNMP user setting, each address, or each network interface which are used for the MIB information acquisition request. Examples of the address include the IP address of the request source of MIB information, the IP address range, or the MAC address. The network interface is a network interface for receiving MIB information, and specifically corresponds to the Network Controller and the connector 422 shown in FIG. 5.

Firstly, a description will be given of an example of settings of an enterprise number for each community setting. When a user selects SNMP v1 using the setting column 702, the CPU 412 displays a community name defined corresponding to SNMP v1 on a screen in association with a response enterprise number. When a user selects a community name on the display screen, the CPU 412 sets an enterprise number corresponding to the selected community name. When the CPU 412 receives an MIB information acquisition request, the CPU 412 acquires a community name included in the request, and returns the set enterprise number corresponding to the acquired community name. In this manner, even when there is a plurality of MIB information acquisition request sources, the MFP 100 can return an enterprise number desired by each request source.

Next, a description will be given of an example of settings for an enterprise number for each user setting. When a user selects SNMP v3 using the setting column 702, the CPU 412 displays a user name defined corresponding to SNMP v3 on a screen in association with a response enterprise number. When a user selects a user name on the displayed screen, the CPU 412 sets an enterprise number corresponding to the selected user name.

When the CPU 412 receives an MIB information acquisition request, the CPU 412 acquires a user name included in the request, and returns the set enterprise number corresponding to the acquired user name. In this manner, the MFP 100 can return an enterprise number corresponding to the user name for SNMP for use in the MIB information acquisition request. Note that the CPU 412 may display a context name corresponding to SNMP v3 on a screen so that a user can set an enterprise number corresponding to the context name.

The CPU 412 may display the IP address of the request source of MIB information, the IP address range, or the MAC address on a screen so that a user can set an enterprise number corresponding to the displayed address.

Also, the CPU 412 may display a network interface name on a screen so that a user can set an enterprise number corresponding to the displayed network interface name. In this manner, the MFP 100 may make an enterprise number to be replied to the MIB information acquisition request received by wireless communication different from an enterprise number to be replied to the MIB information acquisition request received by priority communication.

Figure 8:
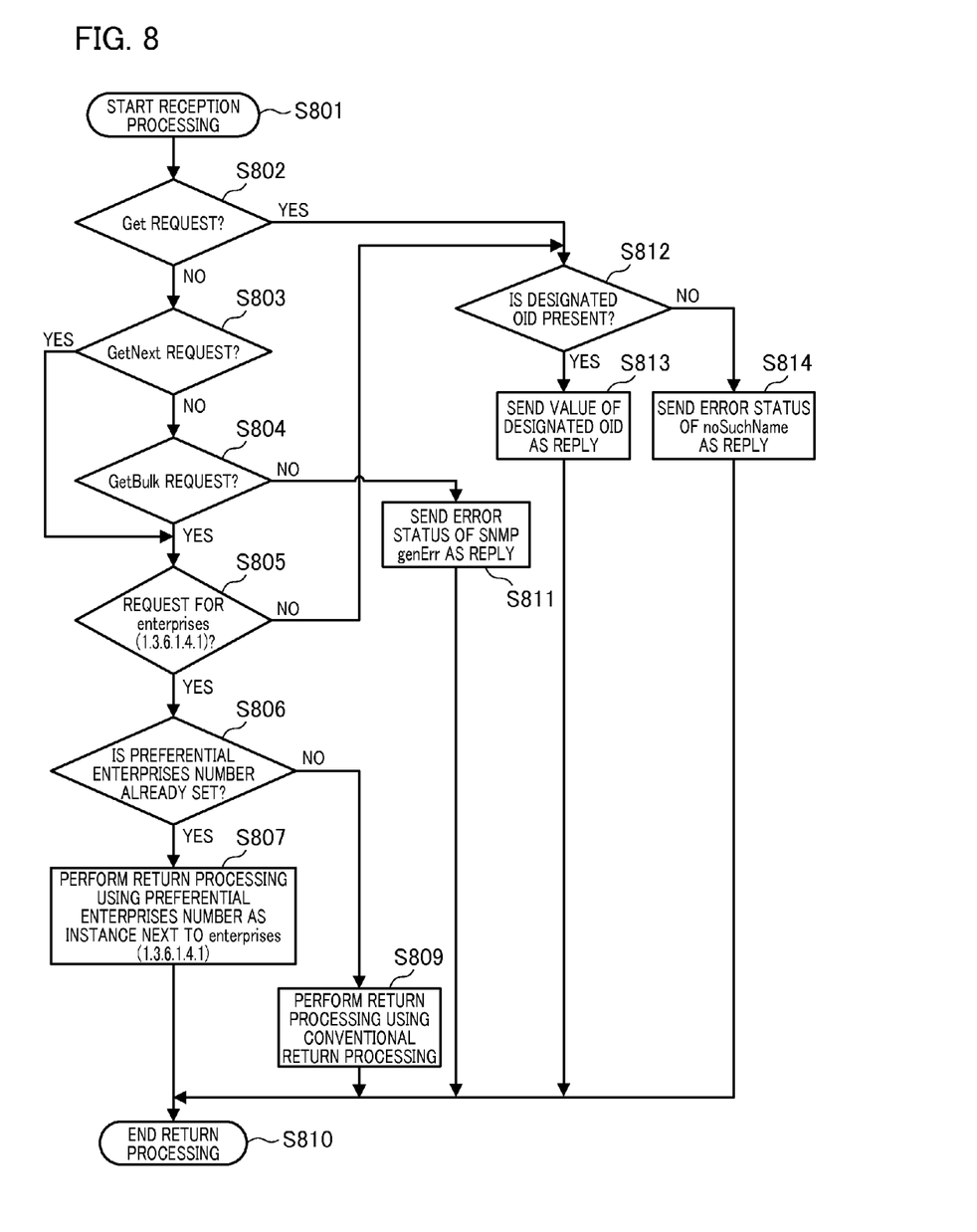
FIG. 8 is a flowchart illustrating an example of operation processing performed by an MFP.

FIG. 8 is a flowchart illustrating an example of operation processing performed by an MFP. The processes in steps shown in FIG. 8 are realized, for example, by reading and executing the program stored in the ROM 414 by the CPU 412.

Firstly, the MFP 100 receives an SNMP packet including an MIB information acquisition request from the PC 161 (step S801). The CPU 412 of the MFP 100 analyzes the received SNMP packet to thereby determine whether or not the MIB information acquisition request is a Get request (step S802).

When the MIB information acquisition request is a Get request, the process advances to step S812. In step S812, the CPU 412 determines whether or not the OID of MIB designated by the MIB information acquisition request is present as information about the MFP 100 (step S812).

When the OID of MIB designated by the MIB information acquisition request is present as information about the MFP 100, the process advances to step S813. In step S813, the CPU 412 transmits the MIB information value of the designated OID back to the PC 161 (step S813), and the process ends (step S810). In other words, when the MIB information acquisition request is a Get request, the CPU 412 returns a value corresponding to a specific OID designated by the request as a response.

When the OID of MIB designated by the MIB information acquisition request is not present as information about the MFP 100, the process advances to step S814. In step S814, the CPU 412 transmits an error status of noSuchName back to the PC 161 (step S814), and the process ends (step S810). NoSuchName is an error code of SNMP indicating that the designated information is not present.

When the MIB information acquisition request is not a Get request in step S801, the process advances to step S803. In step S803, the CPU 412 determines whether or not the received MIB information acquisition request is a GetNext request (step S803). When the MIB information acquisition request is a GetNext request, the process advances to step S805. When the MIB information acquisition request is not a GetNext request, the process advances to step S804.

In step S804, the CPU 412 determines whether or not the received MIB information acquisition request is a GetBulk request (step S804). When the MIB information acquisition request is not a GetBulk request, the CPU 412 determines that the MIB information acquisition request does not correspond to the information acquisition operation defined in SNMP, and the process advances to step S811. Next, the CPU 412 transmits the error status of SNMP genErr back to the PC 161 (step S811). Then, the process ends (step S810).

When the MIB information acquisition request is a GetBulk request in step S804, the process advances to step S805. It is determined in step S805 whether or not the MIB information acquisition request is a request for the OID of enterprises (1.3.6.1.4.1) (step S805). When the MIB information acquisition request is not a request for the OID of enterprises (1.3.6.1.4.1), the process advances to step S812.

When the MIB information acquisition request is a request for the OID of enterprises (1.3.6.1.4.1), the process advances to step S806. In step S806, the CPU 412 determines whether or not an enterprise number which is preferentially responded to the MIB information acquisition request is set (step S806).

When an enterprise number which is preferentially responded to the MIB information acquisition request is not set, the process advances to step S809. Then, the CPU 412 performs return processing in accordance with the conventional return processing (step S809). More specifically, the CPU 412 collectively responds the enterprise numbers that are subordinate to a node corresponding to the OID of enterprises (1.3.6.1.4.1) to the PC 161.

When an enterprise number which is preferentially responded to the MIB information acquisition request is set, the process advances to step S807. Then, the CPU 412 performs the transmission of the reply of SNMP to the PC 161 using the set priority enterprise number as an instance next to enterprises (1.3.6.1.4.1) (step S807), and the process ends (step S810). In other words, the CPU 412 functions as a responding unit that receives an MIB information acquisition request and responds the set enterprise number to the request. For example, when the MIB information acquisition request is a GetNext/GetBulk request, the CPU 412 returns the set enterprise number as a response among the enterprise numbers that are subordinate to a node corresponding to the specific OID designated by the request.

The PC 161 that has received the enterprise number returned in step S807 performs vendor determination based on the enterprise number (step S603 shown in FIG. 6).

As described above, according to the peripheral device of the present invention, when the peripheral device has a plurality of enterprise numbers for MIB and receives an MIB information acquisition request, the peripheral device can respond the enterprise number designated by a user of the peripheral device in advance. Thus, an external device can execute the subsequent management relating to the peripheral device based on the responded enterprise number, resulting in an improvement in the convenience of management of the peripheral device.

In other words, according to the peripheral device, that is, the MFP 100 of the present embodiment, the following effects may be provided. The peripheral device of the present embodiment sets an enterprise number, which is preferentially replied to the MIB information acquisition request, in advance, so that the external device of the request source can explicitly designate Private MIB intended to be managed. Thus, the convenience of device management using the MPS application is improved.

When the peripheral device of the present embodiment receives a GetNext/GetBulk request for enterprises (1.3.6.1.4.1), the peripheral device responds the preset enterprise number to an external device of the request source. Then, the peripheral device performs the same operation as the conventional one when the peripheral device receives a Get request. Thus, the peripheral device of the present embodiment has no adverse influence on MIB information acquisition processing performed by another external device using the linked software specific to a device to be managed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-031622 filed on Feb. 16, 2012, which is hereby incorporated by reference herein in its entirety.

What is claimed is:

1. A peripheral device having a plurality of values as enterprise numbers for management information base (MIB), the peripheral device comprising:
   a setting unit configured to set an enterprise number in accordance with a reception of a request including a designation of a specific object ID, wherein the request is used for acquiring an enterprise number of a lower node according to a specific rule and the specific object ID;
   a reception unit configured to receive a request including a designation of a specific object ID from an external device; and a responding unit configured to respond to the received request with the enterprise number set by the setting unit, wherein the setting unit sets the enterprise number regardless of the specific rule corresponding to the request.

2. The peripheral device according to claim 1, wherein the setting unit sets a response enterprise number in accordance with a response enterprise number designating operation or a non-response enterprise number designating operation by a user of the peripheral device.

3. The peripheral device according to claim 1, wherein the setting unit sets the response enterprise number for each any one of community settings for Simple Network Management Protocol (SNMP) for use in the request, user settings for SNMP, a request source address, and a network interface for receiving the request.

4. The peripheral device according to claim 1, wherein the setting unit provides a different method for setting the enterprise number in response to the version of Simple Network Management Protocol (SNMP) for use in the request.

5. The peripheral device according to claim 1, wherein, when the request for acquiring an enterprise number from the external device is a GetNext request, the responding unit returns an enterprise number set by the setting unit among enterprise numbers that are subordinate to a node corresponding to the specific object ID designated by the request as a response.

6. The peripheral device according to claim 1, wherein, when the request for acquiring an enterprise number from the external device is a Get request, the responding unit returns a value corresponding to the specific object ID designated by the request as a response.

7. A system that performs device management using Simple Network Management Protocol (SNMP), the system comprising:
a peripheral device having a plurality of values as enterprise numbers for management information base (MIB); and
an information processing device that manages the peripheral device, wherein the peripheral device comprises:
a setting unit configured to set an enterprise number in accordance with a reception of a request including a designation of a specific object ID, wherein the request is used for acquiring an enterprise number of a lower node according to a specific rule and the specific object ID;
a reception unit configured to receive a request including a designation of a specific object ID from an external device; and
a responding unit configured to respond to the received request with the enterprise number set by the setting unit,
wherein the setting unit sets the enterprise number regardless of the specific rule corresponding to the request, and
wherein the information processing device comprises:
a requesting unit configured to make the request to a peripheral device;
a receiving unit configured to receive an enterprise number corresponding to the request as a response from the peripheral device; and
a managing unit configured to manage a peripheral device of a transmission source of the response as a device of a type to be specified by the enterprise number included in the response.

8. The system according to claim 7, wherein the requesting unit further makes a request for acquiring management information that is subordinate to a node corresponding to the enterprise number for MIB to the information processing device that is managed by the managing unit as a device of a type to be specified by the enterprise number.

9. A control method performed in a peripheral device having a plurality of values as enterprise numbers for management information base (MIB), the control method comprising:
setting an enterprise number in accordance with a reception of a request including a designation of a specific object ID, wherein the request is used for acquiring an enterprise number of a lower node according to a specific rule and the specific object ID;
receiving a request including a designation of a specific object ID from an external device; and
responding to the received request with the enterprise number set by the setting,
wherein the enterprise number is set regardless of the specific rule corresponding to the request.

10. A non-transitory storage medium on which is stored a computer program for making a computer execute a control method performed in a peripheral device having a plurality of values as enterprise numbers for management information base (MIB), the control method comprising:
setting an enterprise number in accordance with a reception of a request including a designation of a specific object ID, wherein the request is used for acquiring an enterprise number of a lower node according to a specific rule and the specific object ID;
receiving a request including a designation of a specific object ID from an external device; and
responding to the received request with the enterprise number set by the setting,
wherein the enterprise number is set regardless of the specific rule corresponding to the request.

* * * * *